United States Patent
Lee et al.

(10) Patent No.: US 10,630,619 B2
(45) Date of Patent: Apr. 21, 2020

(54) ELECTRONIC DEVICE AND METHOD FOR EXTRACTING AND USING SEMANTIC ENTITY IN TEXT MESSAGE OF ELECTRONIC DEVICE

(71) Applicant: SAMSUNG ELECTRONICS CO., LTD., Suwon-si (KR)

(72) Inventors: Muwoong Lee, Cheongju-si (KR); Yoonkyong Lee, Seoul (KR); Jaewon Lee, Suwon-si (KR); Seokjin Chang, Suwon-si (KR); Sunghoon Cho, Seoul (KR); Sangmi Kim, Suwon-si (KR); Donghyun Roh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 813 days.

(21) Appl. No.: 14/624,982

(22) Filed: Feb. 18, 2015

(65) Prior Publication Data
US 2015/0236991 A1  Aug. 20, 2015

(30) Foreign Application Priority Data
Feb. 14, 2014 (KR) .................. 10-2014-0017369

(51) Int. Cl.
*H04L 12/58* (2006.01)
*G06F 16/33* (2019.01)
(Continued)

(52) U.S. Cl.
CPC ........ *H04L 51/046* (2013.01); *G06F 16/3331* (2019.01); *G06F 17/278* (2013.01); *G06Q 10/10* (2013.01); *H04L 51/18* (2013.01)

(58) Field of Classification Search
CPC ................................ G06F 17/30657
See application file for complete search history.

(56) References Cited

U.S. PATENT DOCUMENTS

2003/0177008 A1* 9/2003 Chang .................... G10L 17/26
704/255
2005/0223067 A1* 10/2005 Buchheit ............. G06Q 10/107
709/206
(Continued)

FOREIGN PATENT DOCUMENTS

| CN | 101079784 A | 11/2007 |
|---|---|---|
| CN | 101706794 A | 5/2010 |

(Continued)

OTHER PUBLICATIONS

Farhad Abedini et al., 'From Text to Knowledge: Semantic Entity Extraction using YAGO Ontology', International Journal of Machine Learning and Computing, Jun. 2011, vol. 1, No. 2, pp. 113-119 (http://www.ijmlc.org/index.php?m=content&c=index&a=show&catid=23&id=22) See p. 113, left column, line 1-p. 119, left column, line 4; tables I-IV; and figures 1-4, 10-11.
(Continued)

*Primary Examiner* — Philip J Chea
*Assistant Examiner* — Ishrat Rashid
(74) *Attorney, Agent, or Firm* — Sughrue Mion, PLLC

(57) ABSTRACT

Disclosed is a method of extracting and using a semantic entity from a text message by an electronic device. The method includes: recognizing a text-based input; extracting a semantic entity from the text-based input; and providing the extracted semantic entity through an application in response to the application having a semantic setting that corresponds to the extracted semantic entity.

10 Claims, 5 Drawing Sheets

(51) Int. Cl.
  *G06F 17/27* (2006.01)
  *G06Q 10/10* (2012.01)

(56) References Cited

U.S. PATENT DOCUMENTS

| | | |
|---|---|---|
| 2008/0170786 A1 | 7/2008 | Tomizawa et al. |
| 2008/0201434 A1 | 8/2008 | Holmes et al. |
| 2008/0201636 A1 | 8/2008 | Fujiwara |
| 2010/0293166 A1 | 11/2010 | Hatami-Hanza |
| 2011/0040766 A1* | 2/2011 | Robinson ............ G06F 17/3053 707/749 |
| 2011/0252065 A1* | 10/2011 | Ryu ................ G06F 16/41 707/794 |
| 2011/0264997 A1* | 10/2011 | Mukerjee .......... G06F 17/30663 715/256 |
| 2011/0320548 A1 | 12/2011 | Jonsson |
| 2012/0011084 A1 | 1/2012 | Gulwani et al. |
| 2012/0084074 A1 | 4/2012 | Chronister et al. |
| 2013/0024197 A1* | 1/2013 | Jang ................ G10L 15/22 704/246 |
| 2013/0031076 A1 | 1/2013 | Bhola et al. |
| 2013/0031110 A1 | 1/2013 | Bhola et al. |
| 2013/0031500 A1 | 1/2013 | Bhola et al. |
| 2013/0036117 A1* | 2/2013 | Fisher ............... G06F 16/487 707/736 |
| 2013/0110911 A1* | 5/2013 | Chow ............... G06Q 30/0263 709/203 |
| 2013/0166280 A1* | 6/2013 | Quast ............... G06F 17/241 704/9 |
| 2013/0288722 A1* | 10/2013 | Ramanujam ........... H04W 4/14 455/466 |
| 2016/0048500 A1* | 2/2016 | Hebert ................. G06F 17/243 704/9 |

FOREIGN PATENT DOCUMENTS

| | | |
|---|---|---|
| CN | 102236696 A | 11/2011 |
| CN | 102624647 A | 8/2012 |
| CN | 102682065 A | 9/2012 |
| KR | 10-2011-0109361 A | 10/2011 |
| WO | 2013/015852 A1 | 1/2013 |

OTHER PUBLICATIONS

International Search Report dated Apr. 30, 2015 issued by the International Searching Authority in counterpart Application No. PCT/KR2015/001584.
Tony John, "What is Semantic Search and how it works with Google search", Techulator, Mar. 15, 2012, Retrieved from the Internet: URL:http://www.techulator.com/resources/59 33-What-Semantic-Search.aspx [retrieved on Sep. 21, 2017], XP055408737. (ten (10) pages total).
Communication dated Sep. 29, 2017 by the European Patent Office in counterpart European Patent Application No. 15748680.4.
Communication dated Sep. 4, 2018, issued by the Chinese Patent Office in counterpart Chinese Application No. 201580008452.7.
Communication dated Dec. 2, 2019, issued by the Korean Intellectual Property Office in corresponding Korean Application No. 10-2014-0017369.
Communication dated Feb. 3, 2020, from the State Intellectual Property Office of People's Republic of China in counterpart Application No. 201580008452.7.

* cited by examiner

ELECTRONIC DEVICE AND METHOD FOR EXTRACTING AND USING SEMANTIC ENTITY IN TEXT MESSAGE OF ELECTRONIC DEVICE

CROSS-REFERENCE TO RELATED APPLICATION

This application claims priority from and the benefit under 35 U.S.C. § 119(a) of Korean Patent Application No. 10-2014-0017369, filed on Feb. 14, 2014 in the Korean Intellectual Property Office, the disclosure of which is incorporated herein in its entirety by reference.

BACKGROUND

1. Field

Apparatuses and methods consistent with exemplary relate to an electronic device and a method of extracting and using a semantic entity in a text message of an electronic device.

2. Description of the Related Art

Recent electronic devices provide various features to users. For example, electronic devices provide a number of features, such as a basic mobile phone service that allows a user to call, built-in cameras to capture an image or video, video streaming, video downloading, Internet access and browsing, and the like. Further, electronic devices provide a message function through which a user can exchange messages with other users. Recent electronic devices display transmitted/received messages through a user interface in a conversation type. Transmission of messages between users using electronic devices plays an important role in information transmission between the users.

Meanwhile, when a user desires to recall a semantic entity (for example, a place name, a shop name, and an address) received through messages transmitted/received to/from an electronic device when necessary later, the user should pass through a complex process to recall and search for some of the content to be found, or recall a conversation partner to which a semantic entity was transmitted, as well as, a conversation time, and search for the corresponding content.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an electronic device and a method of extracting a semantic entity from a text message, and provide a method of searching for a content included in the text message based on the extracted semantic entity.

In accordance with an aspect of an exemplary embodiment, there is provided a method of using a semantic entity by an electronic device. The method includes: recognizing a text-based input; extracting a semantic entity from the text-based input; and providing the extracted semantic entity through an application in response to the application having a semantic setting that corresponds to the extracted semantic entity.

The recognizing the text-based input may include transmitting or receiving a text message and recognizing a context from the text message, and the extracting may include extracting the semantic entity from the recognized context.

The recognizing the text-based input may include receiving a voice command and recognizing a context from the voice command, and the extracting may include extracting the semantic entity from the recognized context.

The method may further include storing a plurality of semantic entities in a database, the plurality of semantic entities include the extracted semantic entity.

The application includes an input field and the semantic setting corresponds to a semantic setting content of the input field. The method may further include searching the database for semantic entities according to the semantic setting content.

The searching may include ranking the searched semantic entities.

The extracting may include extracting at least one of a content of the extracted semantic entity, a type of the extracted semantic entity, and a source of the extracted semantic entity.

The searching may include ranking the searched semantic entities according to a receiving or transmitting time, reliability, or a recipient or sender of the searched semantic entities.

The method may further include suggesting the searched semantic entities in an order of the ranking.

The suggesting may include displaying a message from which the suggested semantic entities are extracted or reconstructing a messaging service as original.

The ranking may include calculating a weighted average of at least one of the receiving or transmitting time, the reliability, and the recipient or sender, and ranking the searched semantic entities based on the weighted average.

In accordance with another aspect of an exemplary embodiment, an electronic device is provided. The electronic device includes: a communication unit configured to receive a text-based input; a controller configured to extract a semantic entity included in the text-based input; a memory configured to store the text-based input and the extracted semantic entity as a database; and a display configured to output the extracted semantic entity in response to an executed application having a semantic setting that corresponds to the extracted semantic entity.

The controller may include a semantic entity extraction unit configured to extract the semantic entity included in the text-based input.

The application may include an input field, and wherein the controller is further configured to control the display to display the application, identify a semantic setting content of the input field, search for semantic entities stored in the memory according to the semantic setting content, and rank the searched semantic entities.

The controller may extract at least one of a content of the extracted semantic entity, a type of the extracted semantic entity, and a source of the extracted semantic entity from the text-based input.

The controller may rank the searched semantic entities according to a receiving or transmitting time, reliability, or a recipient or sender of the searched semantic entities.

The controller may be further configured to control the display to display the searched semantic entities in an order of the ranking in response to the application being executed.

The controller may be further configured to display a message from which the searched semantic entities are extracted or reconstruct a messaging service as original.

The text-based input may be a message, and the device may further include an input unit configured to generate an input signal for generating the message and an input signal for inputting the searched semantic entities into the input field of the application.

An electronic device and a method of extracting and using a semantic entity in a text message of an electronic device uses a semantic entity included in a text message, so that a user can easily and intuitively search for the content included in the text message.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
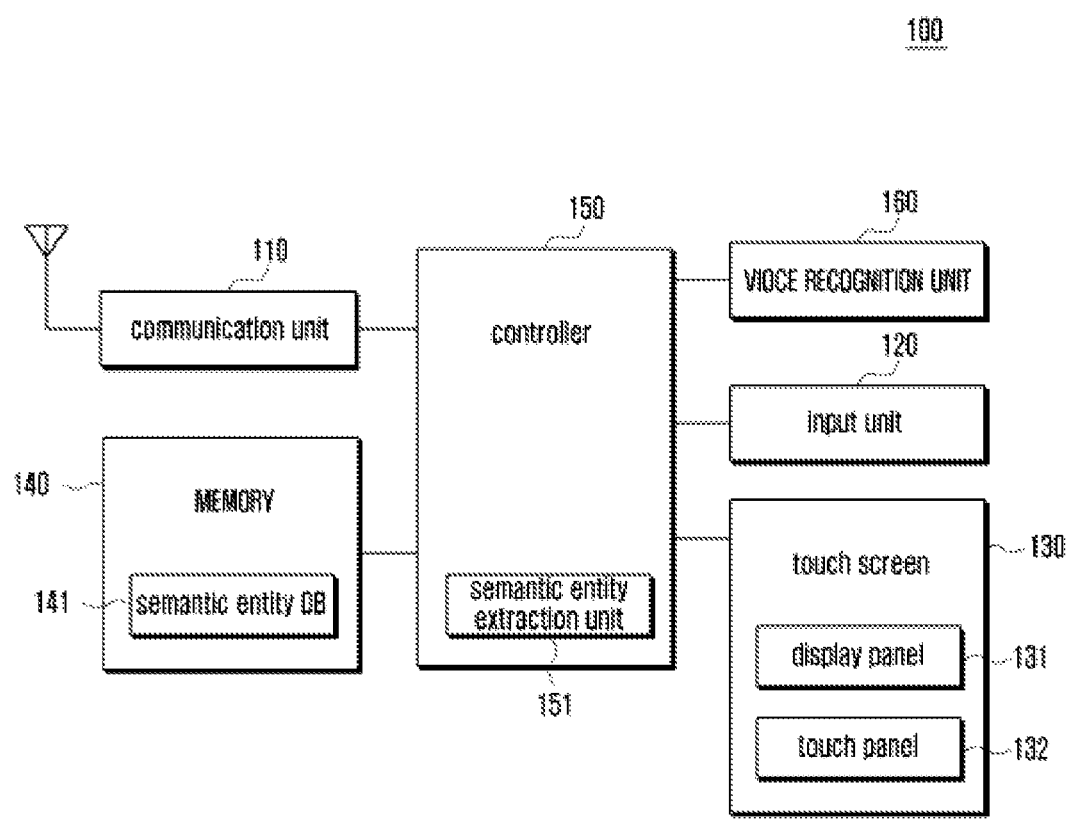
FIG. 1 is a block diagram illustrating a configuration of an electronic device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a block diagram illustrating a configuration of an electronic device 100 according to an exemplary embodiment.

The electronic device 100 includes a communication unit 110, an input unit 120, a touch screen 130, a memory 140, a controller 150, and a voice recognition unit 160.

The electronic device 100 corresponds to a device that provides a message transmitting/receiving function and may be a mobile communication terminal, a smart phone, a tablet Personal Computer (PC), a PC, a hand-held PC, a Portable Multimedia Player (PMP), a Personal Digital Assistant (PDA), a notebook PC or the like.

The communication unit 110 supports a wired/wireless communication function of the electronic device 100. When the electronic device 100 supports the wired communication function, the communication unit 110 may include a wired communication module. When the electronic device 100 supports the wireless communication function, the communication unit 110 may include a wireless communication module. The communication unit 110 may include a mobile communication module and/or a short-range communication module as the wireless communication module. The communication unit 110 may include a Radio Frequency (RF) transmitter (not shown) for up-converting and amplifying a frequency of a transmitted signal and an RF receiver (not shown) for low noise-amplifying a received signal and down-converting a frequency. The communication unit 110 may transmit and receive messages to and from one or more counterpart electronic devices (for example, an electronic device of a counterpart user in conversation). Messages according to an exemplary embodiment may include an instant message, a Short Message Service (SMS) for displaying messages through a User Interface (UI) of a conversation type, a Multimedia Message Service (MMS), e-mail, and a unified messenger service. Messages according to another exemplary embodiment may be characters or an image including characters.

The input unit 120 may include a plurality of input keys and function keys for receiving number or character information and configuring various functions. The function keys may include a direction key, a side key, and a shortcut key, which are set to execute particular functions. The input unit 120 may generate a key signal related to a user setting and a control of functions of the electronic device 100 and transmit the generated key signal to the controller 150. The input unit 120 may be configured by one or a combination of input means, such as a qwerty keypad, a 3*4 keypad, a 4*3 keypad, a ball joystick, an optical joystick, a wheel key, a touch key, a touch pad, and a touch screen. For example, when the electronic device 100 supports a touch screen, the input unit 120 may include only some function keys, such as a volume key, a power key, a menu key, a cancellation key, and a home key. The input unit 120 according to an exemplary embodiment may generate an input signal for generating a message and an input signal for inputting a suggested semantic entity into an input field, and transmit the generated input signals to the controller 150.

The touch screen 130 may perform an input function and a display function. The touch screen 130 may include a display panel 131 and a touch panel 132. The display panel 131 displays information input by a user or information to be provided to the user as well as various menus of the electronic device 100. The display panel 131 may be formed by one of a Liquid Crystal Display (LCD), an Organic Light Emitting Diode (OLED), and an Active Matrix Organic Light Emitted Diode (AMOLED). The display panel 131 may provide various screens according to the use of the electronic device 100, for example, a home screen, a menu screen, a webpage screen, and a call screen. The display panel 131 may display text messages on a conversation screen by using a speech bubble. The display panel 131 may also display a screen for executing an application including an input field and a screen for displaying a suggested semantic entity.

The touch panel 132 is a device for providing an input function and may generate a touch event when a touch input device, for example, a user's finger, a stylus pen, or an electronic pen contacts or approaches the electronic device and transmit the generated touch event to the controller 150. The touch panel 132 may recognize the generation of the touch event through a change in physical quantity (for example, capacitance, electromotive force, resistance or the like) according to the contact or approach of the touch input device, and transmit the type of the generated touch event (tap, touch movement (drag, flick or the like), long touch, double touch, multi-touch or the like) and touch position information to the controller 150. The touch panel 132 may generate a touch signal for generating a message and a touch signal for inputting a suggested semantic entity into an input field, and transmit the generated touch signals to the controller 150.

The voice recognition unit 160 may receive a voice signal that is generated by a microphone included in the input unit 120 when a user speaks a voice command. The voice recognition unit 160 may capture a meaning of the voice command and generate command data corresponding to the captured meaning of the voice command. Then, the voice recognition unit 160 may transmit the generated command data to the controller 150.

The memory 140 may store an Operating System (OS) of the electronic device 100 and applications necessary for other optional functions, for example, a sound reproduction function, an image or video reproduction function, a broadcast reproduction function, an Internet access function, and a text message function. The memory 140 may store various types of data, for example, a document file, a video file, a game file, a music file, a movie file and the like. The memory 140 may include a text message and a semantic entity database 141. The semantic entity database 141 may include a semantic entity extracted from a transmitted/received message. The semantic entity database 141 may store a content of the semantic entity (for example, text), a type of the semantic entity (a place name, a person name, an address, a phone number, a song title, a schedule, a movie title or the like), a source of the semantic entity (an original message from which the semantic entity is extracted).

The controller 150 may control an overall operation of the electronic device 100 and a signal flow between internal blocks of the electronic device 100, and perform a data processing function. For example, the controller 150 may include a Central Processing Unit (CPU), an Application Processor (AP), and the like. The controller 150 may be implemented by a single core processor or a multi-core processor.

The controller 150 may control a process of extracting a semantic entity. The controller 150 may include a semantic entity extraction unit 151 to extract a semantic entity from a transmitted/received message. The controller 150 may extract a content of the semantic entity (for example, text), a type of the semantic entity (a place name, a person name, an address, a phone number, a song title, a schedule, a movie title or the like), a source of the semantic entity (an original message from which the semantic entity is extracted). The extracted semantic entity may be stored in the memory 140 as the semantic entity database 141 under a control of the controller 150. When an application including an input field is executed, the controller 150 may control the display panel 131 to output the application. The controller 150 may identify a semantic setting content to determine which type of value is suitable for the input field. For example, when an application including an input field is a map application, the map application may be configured to search for a place name or address, which is called a semantic setting. The controller 150 may control the display panel 131 to identify a semantic setting configured for an application to search for semantic entities, rank the semantic entities, and output the semantic entities in an order as ranked. When a transmitted/received message is an image including characters, the controller 150 may extract a semantic entity through characters extracted from the image. In order to extract the characters from the image, the electronic device 100 may include a character reader function.

Figure 2:
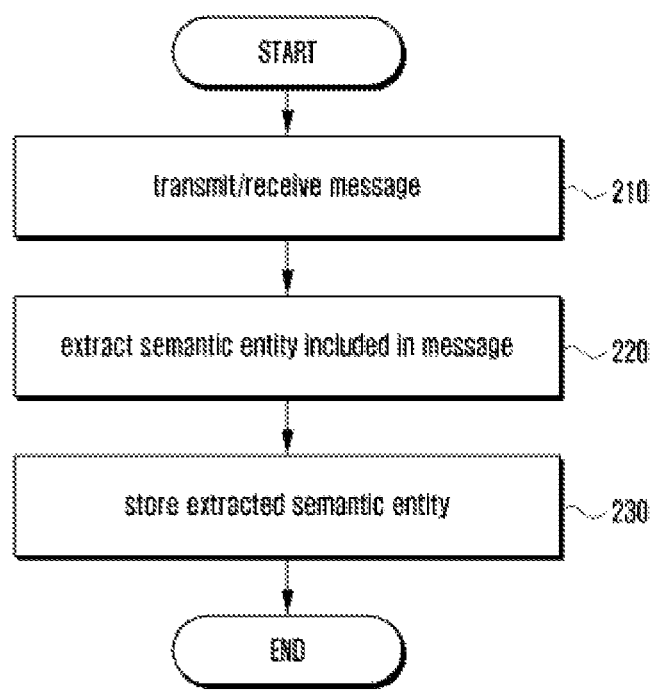
FIG. 2 is a flowchart illustrating a method of extracting a semantic entity by an electronic device according to an exemplary embodiment.

FIG. 2 is a flowchart illustrating a method of extracting a semantic entity by the electronic device 100 according to an exemplary embodiment.

The electronic device 100 may transmit/receive a message to/from other electronic devices in operation 210. The electronic device 100 may extract from the message a semantic entity including a content (for example, text), a type (a place name, a person name, an address, a phone number, a song title, a schedule, a movie title or the like), a source (an original message from which the semantic entity is extracted) of the semantic entity in operation 220. The electronic device 100 may store the extracted semantic entity (for example, the content of the semantic entity, the type of the semantic entity, the source of the semantic entity, or the like) as a database in operation 230.

Figure 3:
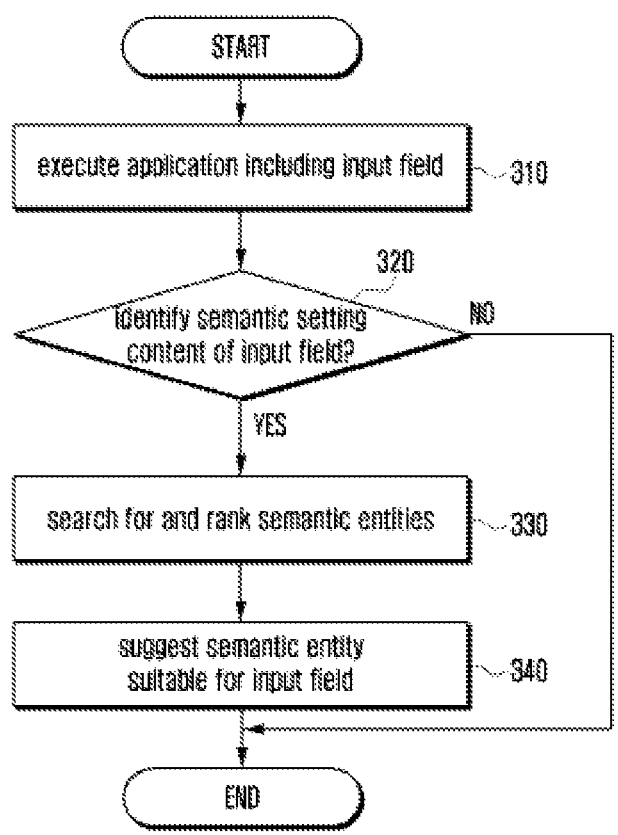
FIG. 3 is a flowchart illustrating a method of using a semantic entity by an electronic device according to an exemplary embodiment.

FIG. 3 is a flowchart illustrating a method of using an extracted semantic entity by the electronic device 100 according to an exemplary embodiment.

The electronic device 100 executes an application including an input field in operation 310. The electronic device 100 identifies a semantic setting content of the input field in operation 320. For example, the electronic device 100 may identify which type of semantic entity is suitable for the input field in operation 320. When a semantic setting indicating a type of a semantic entity suitable for the input field exist, the electronic device 100 may search for one or more semantic entities based on the semantic setting and rank the found semantic entities in operation 330. The electronic device 100 may rank the semantic entities according to a receiving or transmitting time of an original message, reliability of a result of an extracted semantic entity, or a recipient or sender of an original message in operation 330. For example, if a source of a semantic entity is a message transmitted/received to/from a number in a favorite contact list of the electronic device 100, the semantic entity may be ranked in a high place. In another example, the controller 150 may calculate a weighted average of three input values (e.g., a receiving or transmitting time of an original message, reliability of a result of an extracted semantic entity, and a recipient or sender of an original message) of a semantic entity, and determine a rank of the semantic entity based on the calculated weighted average.

The electronic device 100 may display the one or more found and ranked semantic entities on the display panel 131 and suggest them to the user in operation 340. While suggesting the one or more found and ranked semantic entities in operation 340, the electronic device 100 may display a message from which the suggested semantic entities are extracted or reconstruct a messaging service as original to be referred to.

Figure 4:
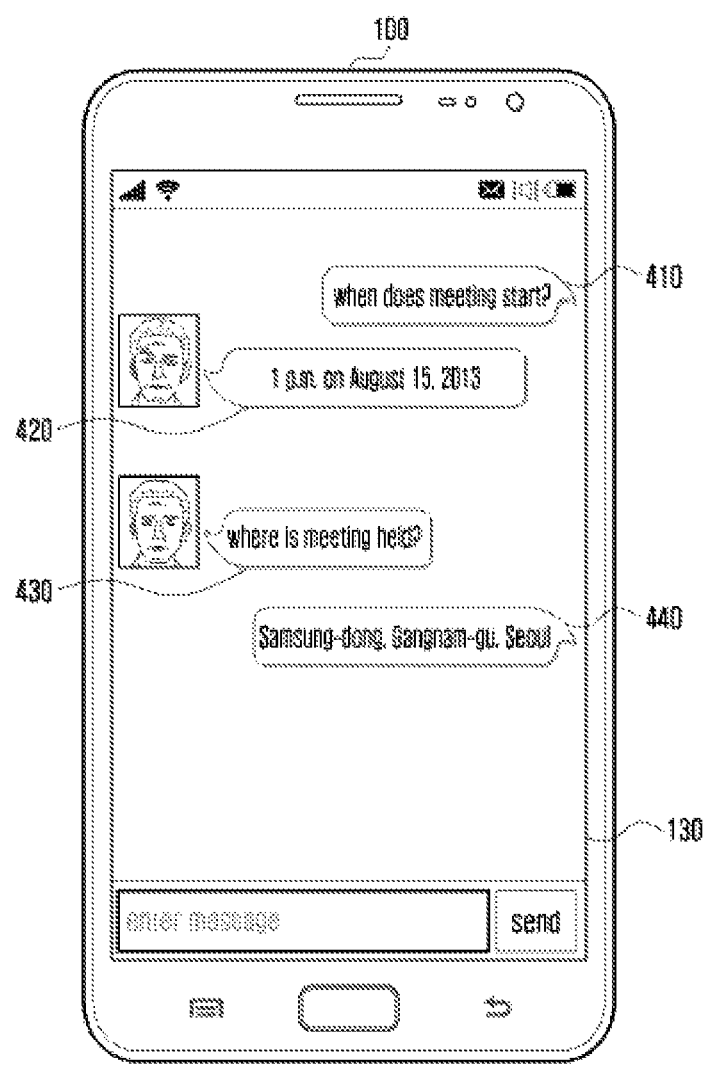
FIG. 4 illustrates a text message user interface according to an exemplary embodiment.

FIG. 4 illustrates a text message user interface according to an exemplary embodiment.

The electronic device 100 may include one or more text messages 410, 420, 430, and 440. The electronic device 100 may extract semantic entities from the text messages 410, 420, 430, and 440, conversation partners, conversation time or the like. For example, the electronic device 100 may extract one or more of a semantic entity content, a semantic entity type, and a semantic entity source from a phrase "1 p.m. on Aug. 15, 2013" included in a text message 420. The electronic device 100 may extract the text (semantic entity content) corresponding to 1 p.m. on Aug. 15, 2013, the semantic entity type corresponding to schedule information, and the semantic entity source corresponding to a conversation partner or conversation time from the phrase "1 p.m. on Aug. 15, 2013" included in the text message 420. Further, the electronic device 100 may extract one or more of the semantic entity content, the semantic entity type, and the semantic entity source from the phrase "Samsung-dong, Gangnam-gu, Seoul" included in a text message 440. The electronic device 100 may extract the text (semantic entity content) corresponding to Samsung-dong, Gangnam-gu, Seoul, the semantic entity type corresponding to place name or address information, and the semantic entity source corresponding to a conversation partner or conversation time from the phrase "Samsung-dong, Gangnam-gu, Seoul" included in the text message 440.

The electronic device 100 may store different types of extracted semantic entities according to the content of text messages. For example, when there is information on a song or movie in the text message content, the electronic device 100 may classify the text message content as a type related to song or movie information and store the text message content. For example, when there is information on food (for example, a food name) in the text message content, the electronic device 100 may classify the text message content as a type related to the food and store the text message content. For example, when there is information on a reservation time in the text message content, the electronic device 100 may classify the text message content as a type related to the reservation time and store the text message content.

Figure 5:
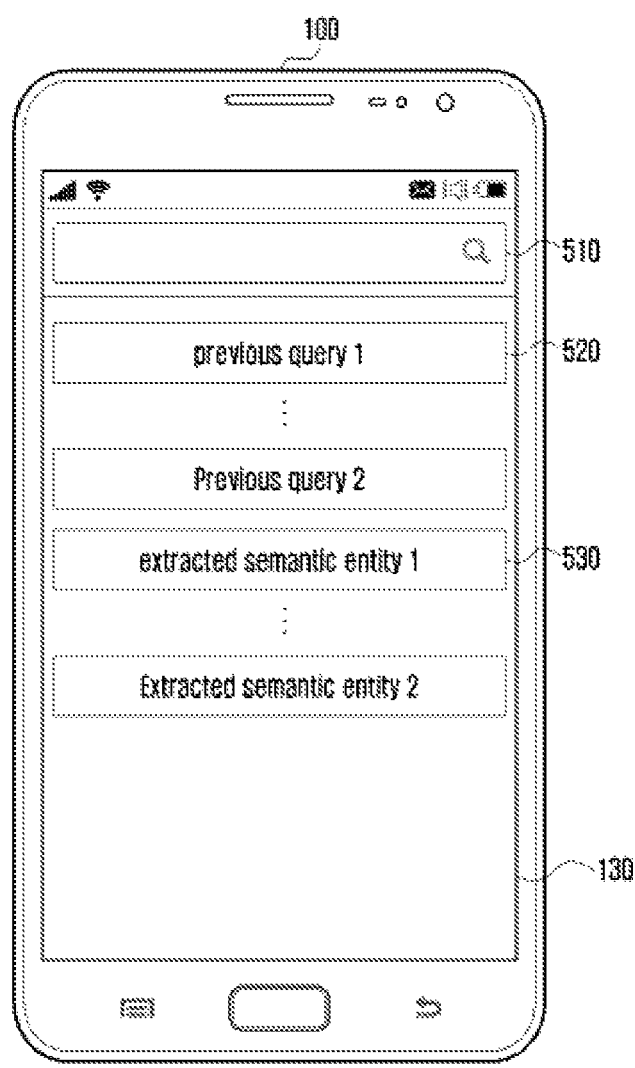
FIG. 5 illustrates a user interface using a semantic entity according to an exemplary embodiment.

FIG. 5 illustrates a user interface using a semantic entity according to an exemplary embodiment.

The electronic device 100 executes and displays an application including an input field 510 on the touch screen 130. The input field 510 is not limited to a field in which a user may type in a text, and may refer to a field that indicate a user input or command (e.g., text, voice command, etc.) that the electronic device 100 recognizes.

When the application including the input field 510 is executed, the electronic device 100 may display one or more previous search queries 520 on the touch screen 130. When the application including the input field 510 is executed, the electronic device 100 may display one or more extracted semantic entities 530 on the touch screen 130. The one or more extracted semantic entities 530 correspond to one or more semantic entities which have been found and ranked through the identification of the semantic setting content to determine which semantic entity is suitable for the input field 510, by the electronic device 100.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of using a semantic entity by an electronic device, the method comprising:
   recognizing a plurality of received messages that are received by the electronic device;
   extracting one or more semantic entities from the plurality of received messages;
   classifying the one or more semantic entities of the plurality of received messages according to information types of the plurality of received messages, and message senders of the plurality of received messages, the information types comprising an information type related to food, an information type related to a time, an information type related to a song, and an information type related to a movie;
   storing the classified one or more semantic entities in a database;
   when a currently executed application is a map application with an input field, searching for place names and addresses from the classified one or more semantic entities in the database, as a semantic setting of the map application, and ranking the searched place names and addresses according to determination of whether the message senders of the plurality of received messages are listed in a favorite contact list of the electronic device; and
   displaying the searched place names and addresses through the map application as a suggested semantic entity in an order of the ranking.

2. The method of claim 1, wherein the plurality of received messages correspond to a plurality of text messages.

3. The method of claim 1, wherein the plurality of received messages correspond to a plurality of voice messages.

4. The method of claim 1, wherein the ranking comprises ranking the searched place names and addresses according to receiving times of the plurality of received messages.

5. The method of claim 1, wherein the displaying the searched place names and addresses comprises, while suggesting the searched place names and addresses in the order of the ranking, displaying one or more messages from which the place names and addresses are identified, in an original state of the one or more messages.

6. An electronic device comprising:
   a display;
   a communication interface configured to receive a plurality of messages;
   a memory configured to store the plurality of messages as a plurality of received messages, and
   a processor configured to:
      extract one or more semantic entities from the plurality of received messages;
      classify the one or more semantic entities of the plurality of received messages according to information types of the plurality of received messages and message senders of the plurality of received messages, the information types comprising an information type related to food, an information type related to a time, an information type related to a song, and an information type related to a movie; and
      control the memory to store the one or more semantic entities;
   wherein the processor is further configured to:
      when a currently executed application is a map application with an input field, search for place names and addresses from the one or more semantic entities in the memory, as a semantic setting of the map application, and rank the searched place names and addresses according to determination of whether the message senders of the plurality of received messages are listed in a favorite contact list of the electronic device; and
      control the display to display the searched place names and addresses through the map application as a suggested semantic entity in an order of the ranking.

7. The electronic device of claim 6, wherein the plurality of received messages correspond to a plurality of voice messages received through the communication interface.

8. The electronic device of claim 6, wherein the plurality of received messages correspond to a plurality of text messages received through the communication interface.

9. The electronic device of claim 6, wherein the processor is further configured to rank the searched place names and addresses according to receiving times of the plurality of received messages, and control the display to provide the searched place names and addresses in the order of the ranking.

10. The electronic device of claim 6, wherein the processor is further configured to display one or more messages from which the searched place names and addresses are identified, in an original state of the one or more messages, while the searched place names and addresses are displayed in the order of the ranking.

\* \* \* \* \*